(12) United States Patent
Bardalai

(10) Patent No.: US 9,705,822 B2
(45) Date of Patent: Jul. 11, 2017

(54) DISTRIBUTING CONTROL PLANE PROCESSING

(75) Inventor: Snigdho C. Bardalai, San Ramon, CA (US)

(73) Assignee: Infinera Corporation, Sunnyvale, CA (US)

( * ) Notice: Subject to any disclaimer, the term of this patent is extended or adjusted under 35 U.S.C. 154(b) by 160 days.

(21) Appl. No.: 13/170,561

(22) Filed: Jun. 28, 2011

(65) Prior Publication Data

US 2013/0003753 A1    Jan. 3, 2013

(51) Int. Cl.
*H04L 12/933*    (2013.01)
(52) U.S. Cl.
CPC ................... *H04L 49/1523* (2013.01)
(58) Field of Classification Search
USPC ......................................................... 370/419
See application file for complete search history.

(56) References Cited

U.S. PATENT DOCUMENTS

| | | | |
|---|---|---|---|
| 2003/0110289 A1* | 6/2003 | Kamboh | H04L 45/00 709/242 |
| 2003/0235168 A1* | 12/2003 | Sharma et al. | 370/338 |
| 2011/0032938 A1* | 2/2011 | Kunjidhapatham | H04L 12/4633 370/392 |

OTHER PUBLICATIONS

Nguyen et al., "Distributed Control Plane Architecture of Next Generation IP Routers," Concordia University, Montreal, QC, Canada, 2009 IEEE, 8 total pages.

* cited by examiner

*Primary Examiner* — Sulaiman Nooristany
(74) *Attorney, Agent, or Firm* — Harrity & Harrity LLP; David L. Soltz

(57) ABSTRACT

A network device includes shelf controllers and interface unit controllers. An interface unit controller, of the interface unit controllers, is configured to receive a message from a different network device; determine whether a session exists for the message; identify a shelf controller, of the shelf controllers, based on the session when the session exists for the message; select the shelf controller, to receive the message, based on a load or mapping of the shelf controller when the session does not exist for the message; and transmit the message to the shelf controller. The shelf controller is configured to program a connection via a data plane of the network device.

7 Claims, 10 Drawing Sheets

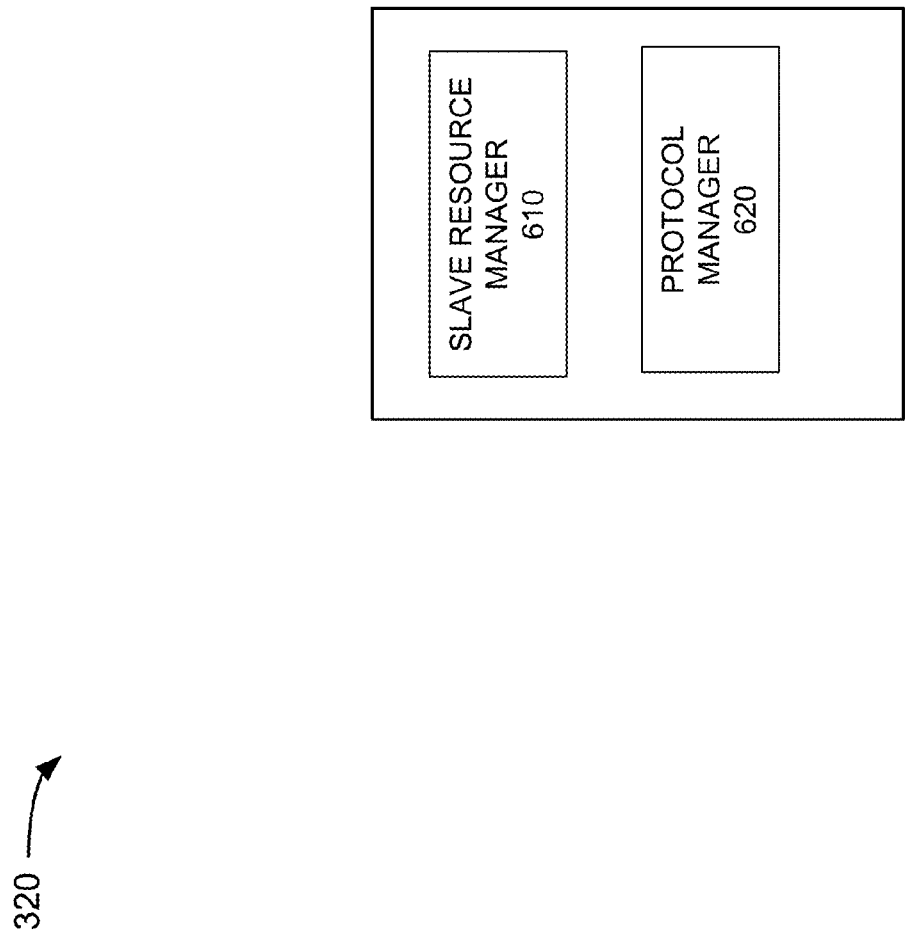

| SESSION IDENTIFIER 710 | SOURCE IDENTIFIER 720 | DESTINATION IDENTIFIER 730 | SHELF CONTROLLER IDENTIFIER 740 |
|---|---|---|---|
| X47 | 172.16.254.1 | 172.16.220.1 | 4 |
| | | | |
| | | | |

FIG. 7A

| SHELF CONTROLLER IDENTIFIER 740 | QUANTITY OF SESSIONS 760 | | |
|---|---|---|---|
| 4 | 7 | | |
| | | | |

DISTRIBUTING CONTROL PLANE PROCESSING

BACKGROUND

Network devices need to handle a growing amount of traffic that is transmitted via networks (e.g., the Internet). Some network devices (e.g., Multiprotocol Label Switching (MPLS) routers) have multiple processors that are distributed across each network device. However, control plane functions, of such a network device, are typically centralized and performed by a single processor of a main control unit (e.g., a node controller) of the network device. Accordingly, such network device designs fail to take advantage of the distributed processing architecture. The centralized architecture imposes heavy processing overhead on the main control unit, which limits scalability and performance of the network device.

SUMMARY

According to one implementation, a network device may include a plurality of shelf controllers and a plurality of interface unit controllers. An interface unit controller, of the plurality of interface unit controllers, may receive a message from a different network device, determine whether a session exists for the message, identify a shelf controller, of the plurality of shelf controllers, based on the session when the session exists for the message, select the shelf controller, to receive the message, based on a load or mapping of the shelf controller when the session does not exist for the message, and transmit the message to the shelf controller. The shelf controller may program a connection, via a data plane of the network device, based on the message.

According to another implementation, a method, performed by a shelf controller of a plurality of shelf controllers of a node, may include: receiving a first block of resources from a node controller of the node; determining whether an amount of unreserved resources, of the shelf controller, is insufficient; transmitting a request for additional resources to the node controller when the amount of unreserved resources is insufficient; receiving a second block of resource from the node controller in response to the request; and allocating a portion of the unreserved resources for a connection via a data plane of the node.

According to yet another implementation, a device may include a plurality of shelf controllers and a plurality of interface unit controllers. The plurality of shelf controllers may populate a forwarding table used to forward data packets via the device. The plurality of interface unit controllers may include a first interface unit controller and a second interface unit controller. The first interface unit controller may receive a first message from an adjacent device; select a shelf controller, of the plurality of shelf controllers, to receive the first message; and transmit the first message to the shelf controller. The first message may include one or more identifiers. The second interface unit controller may receive a second message; select the shelf controller to receive the second message when one or more identifiers included in the second message match the one or more identifiers included in the first message; and transmit the second message to the shelf controller based on the selection of the shelf controller to receive the second message.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6 is a diagram of example functional components of a shelf controller of FIG. 3;

FIGS. 7A and 7B are diagrams illustrating example tables used by the interface unit controller of FIG. 3;

DETAILED DESCRIPTION

The following detailed description refers to the accompanying drawings. The same reference numbers in different drawings may identify the same or similar elements.

One or more implementations, described herein, may provide an architecture that distributes control plane processing. A node (e.g., a network device) may include a node controller, multiple shelf controllers, and multiple interface unit controllers. In one implementation, an interface unit controller, of a node, may receive a Resource Reservation Protocol-Traffic Engineering (RSVP-TE) message. The interface unit controller may select a shelf controller to which to distribute the RSVP-TE message. The interface unit controller may transmit the RSVP-TE message to the selected shelf controller. Accordingly, the node controller does not need to determine how (e.g., to which shelf controller) to distribute each RSVP-TE message that is received by the node.

In another implementation, when a node completes initialization, a node controller, of the node, may allocate an initial block of resources (e.g., labels, bandwidth, hardware resources, etc.) to each shelf controller of the node. A shelf controller may perform admission control and reserve a particular amount of resources for a connection associated with an RSVP-TE message received by the shelf controller. When the shelf controller determines that the shelf controller needs additional resources, the shelf controller may request and receive an additional block of resources from the node controller. Accordingly, the node controller does not need to reserve resources for each individual connection associated with an RSVP-TE message.

RSVP-TE messages may refer to, for example, HELLO messages, acknowledgement (ACK) messages, Summary Refresh (SRefresh) messages, Notify messages, Reservation-Confirmation messages, Path messages, Path-error messages, Path-tear messages, Reservation messages, Reservation error messages, Reservation-tear messages, and/or Recovery-path messages. In one implementation, an RSVP-TE message may include different types of messages.

Example Network

Figure 1:
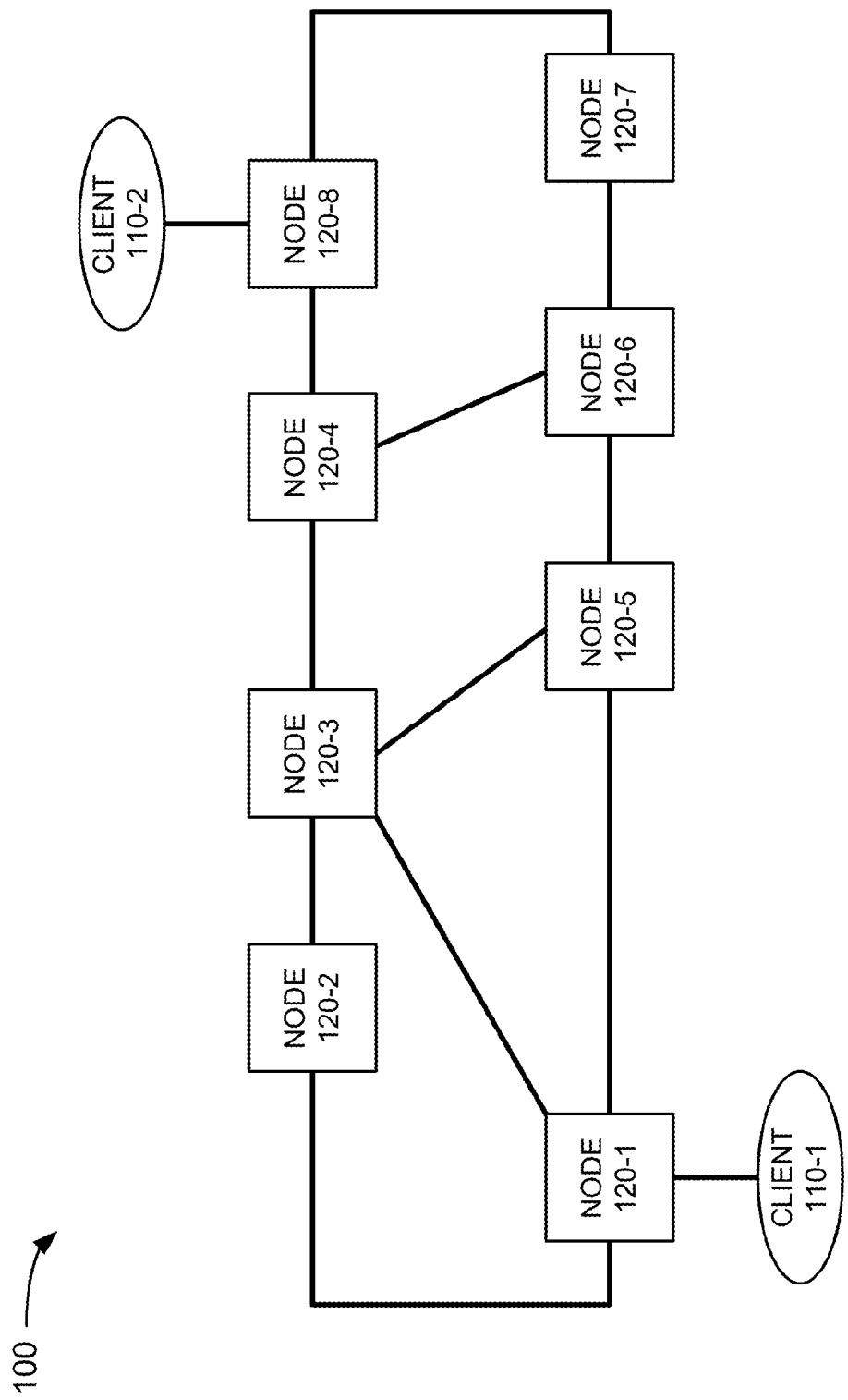
FIG. 1 is a diagram of an example network in which systems and/or methods described herein may be implemented.

FIG. 1 is a diagram of an example network 100 in which systems, devices, and/or methods, described herein, may be implemented. For example, network 100 may include clients 110-1 and 110-2 (referred to collectively as "clients 110," and individually as "client 110") and nodes 120-1, ..., 120-8 (referred to collectively as "nodes 120," and individually as "node 120"). While FIG. 1 illustrates a particular number and arrangement of clients 110 and nodes 120, network 100 may include additional, fewer, different, and/or differently arranged clients 110 and/or nodes 120 than those illustrated in FIG. 1. Also, the connections between clients 110 and/or nodes 120 may include direct and/or indirect connections.

Client 110 may include any type of network device, such as a router, a switch, or a central office, that may transmit data traffic. In one implementation, client 110 may transmit a client signal (e.g., a synchronous optical network (SONET) signal, a synchronous digital hierarchy (SDH) signal, an Ethernet signal, or another type of signal) to node 120. The client signal may conform to any payload type, such as, for example, Gigabit Ethernet (GbE), 2xGbE, Fibre Channel (FC), 1GFC, 10 GbE LAN Phy, 10 GbE WAN Phy, Synchronous Transport Mode 16 (STM-16), STM-64, Optical Carrier level 48 (OC-48), Optical Transport Network (OTN) (e.g., that supports Optical Transport Unit (OTUk) (k=0 ... 4), and OC-192.

Node 120 may include any network device that transmits and/or facilitates transmission of traffic between clients 110 and/or nodes 120. Nodes 120 may perform one or more functions of clients 110. In one implementation, node 110 may take the form of a routing device (e.g., a router, a Multiprotocol Label Switching (MPLS) router, etc.). In another implementation, node 120 may include a dense wavelength division multiplexing (DWDM) device that performs routing or switching functions.

Node 120 may perform optical multiplexing operations (e.g., receive individual client signals on individual optical links and generate a multi-wavelength signal that may be transmitted on a single optical link), optical amplification operations (e.g., amplify the multi-wavelength signal), optical add-drop multiplexing operations (e.g., remove one or more client signals from the multi-wavelength signal), and/or optical demultiplexing operations (e.g., receive the multi-wavelength signal and separate the multi-wavelength signal back into individual client signals that may be transmitted on individual optical links). To perform these operations, node 120 may contain various components, such as an optical multiplexer (to perform the optical multiplexing operations), an optical amplifier (to perform the optical amplification operations), an optical add-drop multiplexer (e.g., a remotely configurable add/drop multiplexer (ROADM)) (to perform the optical add-drop multiplexing operations), and/or an optical demultiplexer (to perform the optical demultiplexing operations).

Nodes 120 may be connected via optical links Data traffic may flow from node-to-node over a series of optical links. Any two nodes 120 may connect via multiple optical links. For bidirectional communication, for example, an optical link (commonly referred to as a "working link") may be dedicated for data traffic transmitted in one direction, another optical link (also commonly referred to as a "working link") may be dedicated for data traffic transmitted in the opposite direction, and yet another optical link (commonly referred to as a "protection link") may be used in case of a failure on a working link. In practice, there may be multiple working links and multiple protection links between two nodes 120, where a quantity of the protection links may be equal to or less than a quantity of the working links.

In one implementation, node 120 may include a data plane, a control plane, and/or a management plane. Each one of the data plane, the control plane, and/or the management plane may represent interdependent functional blocks (e.g., parts of the architecture) of node 120. One or more components of one or more planes may be embedded within the same component and/or within one or more components of another plane. The data plane, also known as a forwarding plane, may forward data packets (e.g., via a switch fabric) that arrive on an inbound interface by referring to a forwarding table. The control plane may populate the forwarding table and perform other routing protocols. The management plane may perform other functions related to network management, protocol policies, quality of service (QoS), etc.

Example Data Plane

Figure 2:
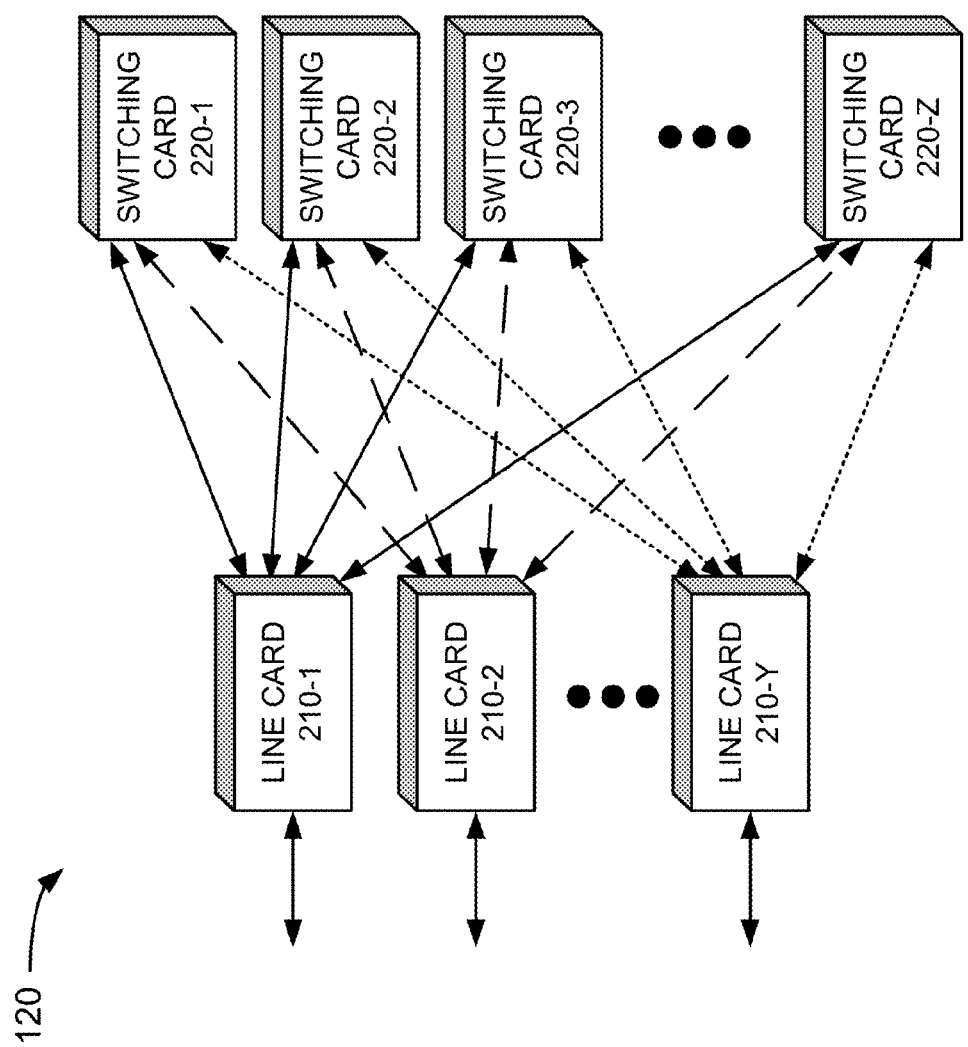
FIG. 2 is a diagram of example components associated with a data plane of a node of FIG. 1.

FIG. 2 is a diagram of example components associated with a data plane of node 120. As shown in FIG. 2, node 120 may include line cards 210-1, 210-2, ..., 210-Y (referred to collectively as "line cards 210," and generally as "line card 210") (where Y≥1) connected to switching cards 220-1, 220-2, ... 220-Z (referred to collectively as "switching cards 220," and generally as "switching card 220") (where Z≥1). While FIG. 2 illustrates a particular number and arrangement of components, line cards 210 and switching cards 220 may include additional components, fewer components, different components, and/or differently arranged components than those illustrated in FIG. 2 and described herein.

Line card 210 may include hardware components, or a combination of hardware and software components, that provide network interface operations. Line card 210 may receive a multi-wavelength optical signal and/or transmit a multi-wavelength optical signal. A multi-wavelength optical signal may include a number of optical signals of different optical wavelengths. In one implementation, line card 210 may perform retiming, reshaping, regeneration, time division multiplexing, and/or recoding services for each optical wavelength. Line card 210 may include one or more tributary modules, while in other instances, line card 210 may not include a tributary module. In another embodiment, line card 210 may label and forward unlabeled packets. Lind card 210 may also forward labeled packets based on incoming label map.

Switching card 220 may include hardware components, or a combination of hardware and software components, that provide switching functions to transfer data between line cards 210. Switching card 220 may be programmed to transfer data from a particular input to a particular output.

As illustrated in FIG. 2, each of line cards 210 may connect to each of switching cards 220. The connections between line cards 210 and switching cards 220 may be bidirectional. While a single connection is shown between a particular line card 210 and a particular switching card 220, the connection may include a pair of unidirectional connections (i.e., one in each direction).

Example Control Plane

Figure 3:
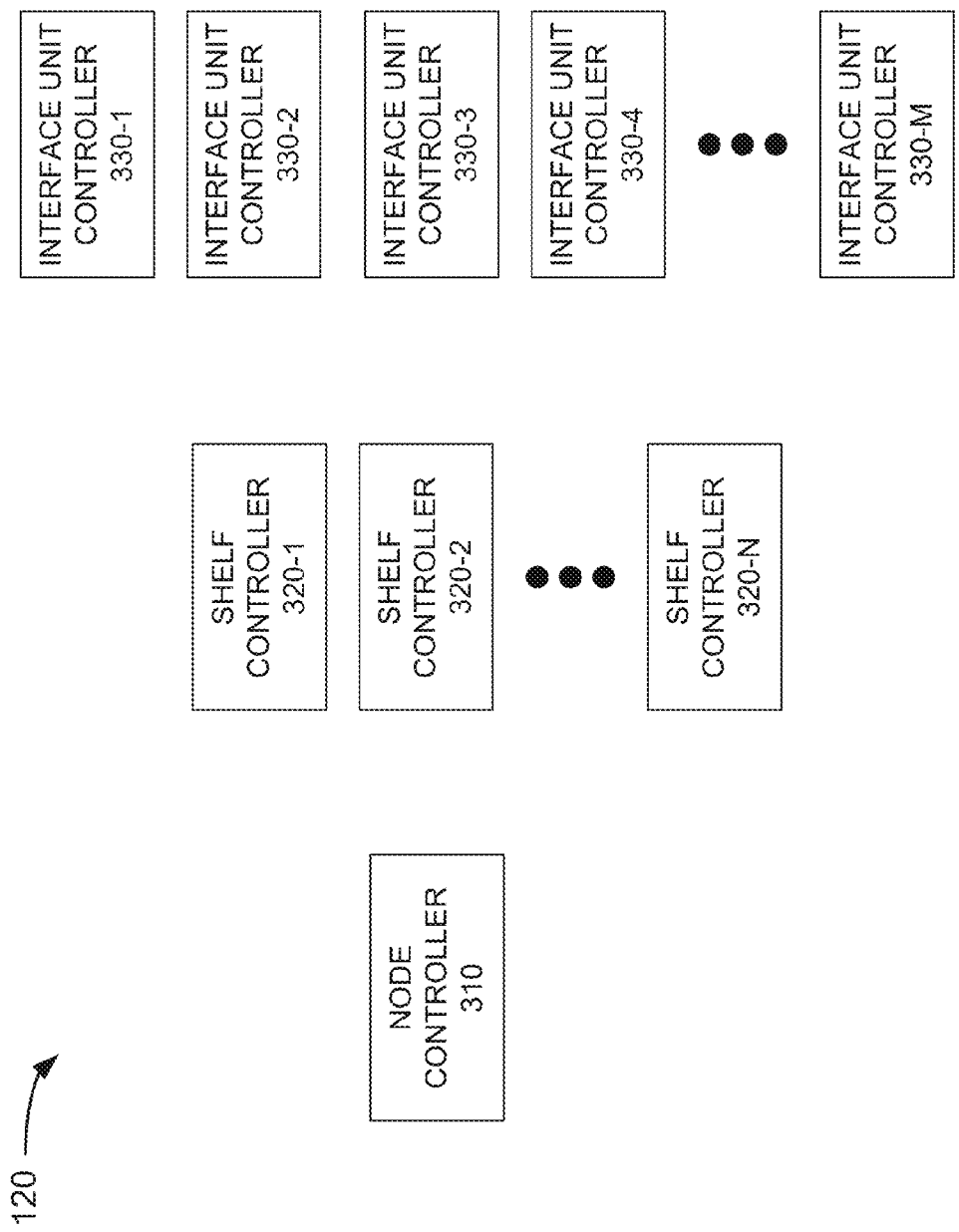
FIG. 3 is a diagram of an example components associated with a control plane of the node of FIG. 1.

FIG. 3 is a diagram of example components associated with a control plane of node 120. As shown in FIG. 3, node 120 may include a node controller 310, shelf controllers 320-1, 320-2, ..., 320-N (referred to collectively as "shelf controllers 320," and generally as "shelf controller 320") (N≥1), and interface unit controllers 330-1, 330-2, ..., 330-M (M≥1) (referred to collectively as "interface unit controllers 330," and generally as "interface unit controller 330"). In one implementation, node 120 may include a particular quantity of interface unit controllers 330 per each shelf controller 320. While FIG. 2 illustrates a particular number and arrangement of controllers, node 120 may include additional controllers, fewer controllers, different controllers, and/or differently arranged controllers than those illustrated in FIG. 3 and described herein. Each one of node controller 310, shelf controllers 320, and/or interface unit controllers 330 may include its own processor and memory, as described further below.

Node controller 310 may manage centralized control plane functions of node 120. Node controller 310 may execute software that controls node 120. Node controller 310 may execute an Open Short Path First (OSPF) protocol, an Intermediate System To Intermediate System (ISIS) protocol, and/or other Short Path First (SPF) processes in order to perform routing computations. Node controller 310 may also execute a Label Distribution Protocol (LDP), or a Targeted LDP (TLDP), in order to distribute labels (e.g., exchange label mapping information) in an MPLS environment. In one implementation, node controller 310 may allocate blocks of resources (e.g., bandwidth, labels, etc.) to shelf controllers 320, as described further below.

Shelf controllers 320 may program hardware of node 120 to allow forwarding of data packets via a data plane of node 120 (e.g., by providing connections via the data plane). Programming the hardware may include populating a forwarding table (e.g., an incoming label map (ILM) table) and/or programming another table associated with line cards 210 and/or other portions of the data plane. Components of the data plane (e.g., line card 210) may use the programmed hardware to route the data packets.

Shelf controllers 320 may further execute Constrained Shortest Path First (CSPF) processes/computations to reserve resources for connections, such as label switched paths (LSPs). An LSP may include entries in MPLS switching tables along a path from an ingress to an egress associated with the LSP.

Shelf controllers 320 may also store RSVP-TE path and resv states (described further below), which represent connection states. Path and resv states may include information about messages sent via different connections (e.g., data paths).

In one implementation, shelf controller 320 may receive allocations of block(s) of resources from node controller 310. When needed, shelf controller 320 may request and receive additional blocks of resources from node controller 310. Shelf controller 320 may allocate resources for each connection associated with an RSVP-TE message received by shelf controller 320 from interface unit controller 330. Shelf controller 320 may program, based on the RSVP-TE message, hardware associated with the data plane of node 120 to allow routing of data packets, as described above. In this situation, the particular shelf controller 320 may becomes a master of a connection associated with the RSVP-TE message.

Interface unit controllers 330 may be embedded within line cards 210. For example, each one of line cards 210 may include one of interface unit controllers 330. Interface unit controller 330, of node 120 (e.g., node 120-1), may receive an RSVP-TE message from another node 120 (e.g., node 120-3). In one implementation, interface unit controller 330 may select/identify a particular shelf controller 320 (e.g., shelf controller 320-1) for the RSVP-TE message. Interface unit controller 330 may distribute the RSVP-TE message to the particular shelf controller 320.

Node controller 310, shelf controllers 320, and/or interface unit controllers 330 may also execute one or more other processes that are distributed between node controller 310, shelf controllers 320, and/or interface unit controllers 330. The one or more other processes may include, for example, OSPF, ISIS, and/or RSVP-TE HELLO processes. Node controller 310, shelf controllers 320, and/or interface unit controllers 330 may exchange relevant information after executing the one or more other processes.

Example Controller

Figure 4:
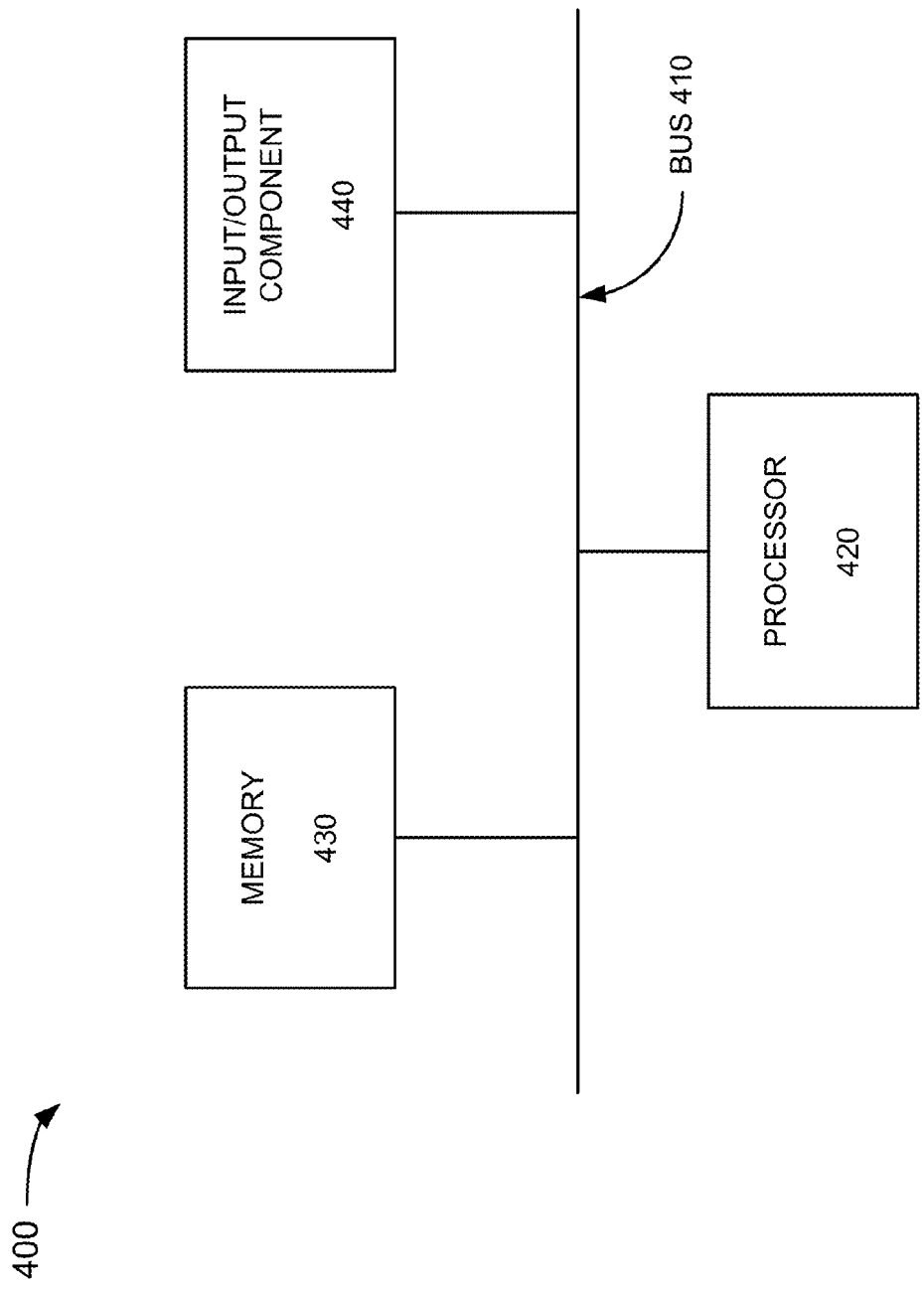
FIG. 4 is a diagram of example components of one or more controllers of FIG. 3.

FIG. 4 is a diagram of example components of a controller 400, which may correspond to node controller 310, shelf controller 320, and/or interface unit controller 330. Each one of node controller 310, shelf controller 320, and/or interface unit controller 330 may include one or more controllers 400 and/or one or more of each one of the components of controller 400. As shown in FIG. 4, controller 400 may include a bus 410, a processor 420, a memory 430, and an input/output component 440.

Although FIG. 4 illustrates example components of controller 400, in other implementations, controller 400 may include additional components, fewer components, different components, or differently arranged components than those illustrated in FIG. 4 and described herein. Alternatively, or additionally, one or more components of controller 400 may perform one or more other tasks described as being performed by one or more other components of controller 400.

Bus 410 may include a path that permits communication among the components of controller 400. Processor 420 may include a processor, a microprocessor, or processing logic (e.g., an application specific integrated circuit (ASIC) or a field programmable gate array (FPGA)) that may interpret and execute instructions. Memory 430 may include a random access memory (RAM) or another type of dynamic storage controller that may store information and instructions for execution by processor 420; a read only memory (ROM) or another type of static storage controller that may store static information and instructions for use by processor 420; a magnetic and/or optical recording medium and its corresponding drive; and/or a removable form of memory, such as a flash memory.

Input/output component 440 may include any transceiver-like mechanism that enables controller 400 to communicate with other controllers and/or systems. For example, input/output component 440 may include a wired interface (e.g., an Ethernet interface, an optical interface, etc.), a wireless interface (e.g., a radio frequency (RF) interface, a wireless fidelity (Wi-Fi) interface, a Bluetooth interface, etc.), or a combination of a wired interface and a wireless interface. Additionally, or alternatively, input/output component 440 may include one or more interfaces (e.g., ports). Input/output component 440 may receive and/or transmit messages and/or packets via the interfaces.

As will be described in detail below, controller 400 may perform certain operations. Controller 400 may perform these and other operations in response to processor 420 executing software instructions (e.g., computer program(s)) contained in a computer-readable medium, such as memory 430, a secondary storage controller (e.g., hard disk, CD-ROM, etc.), etc. A computer-readable medium may be defined as a non-transitory memory device. A memory device may include a space within a single physical memory device or spread across multiple physical memory devices. The software instructions may be read into memory 430 from another computer-readable medium or from input/ output component 440. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Example Functional Components

Figure 5:
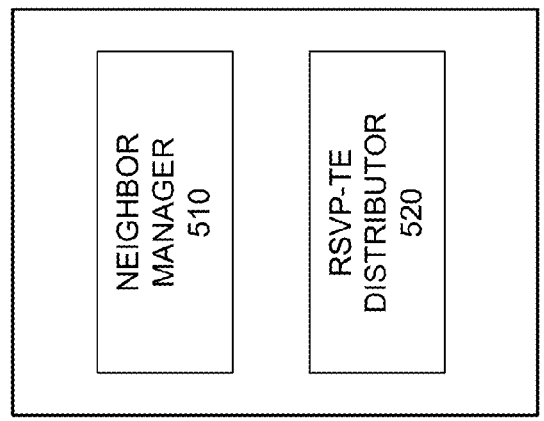
FIG. 5 is a diagram of example functional components of an interface controller of FIG. 3.

FIG. 5 is a diagram of example functional components of interface unit controller 330 of node 120. As shown in FIG. 5, interface unit controller 330 may include a neighbor manager 510 and an RSVP-TE distributor 520. Each of functional components 510 and 520 may be implemented within one or more of the components illustrated in FIG. 4. While FIG. 5 illustrates a particular number and arrangement of functional components, interface unit controller 330 may include additional functional components, fewer functional components, or different functional components.

Neighbor manager 510 may manage (external) interactions with other nodes 120. Neighbor manager 510 may manage the transmitting and/or the receiving of RSVP-TE messages to/from other nodes 120. Neighbor manager 510 may also perform various neighbor management functions associated with the RSVP-TE message, such as, for example, RSVP-TE HELLO messaging, SRefresh messaging, and/or other messaging related to neighbor relationships between nodes 120. RSVP-TE HELLO messaging is a continuous process that is used to determine that adjacent nodes 120 are operational. SRefresh messaging is used to verify that multiple connections between multiple nodes 120 (e.g., RSVP state(s) along path(s)) are functioning.

RSVP-TE distributor 520 may distribute RSVP-TE messages to shelf controllers 320. RSVP-TE distributor 520 may determine whether a session exists for a received RSVP-TE message based on, identifier(s) included in the RSVP-TE message. Herein, the session may refer to a connection or a label-switched path in an MPLS network. The session may specify a particular shelf controller 320 that is a recipient of RSVP-TE messages that include the identifiers. The identifiers may include, for example, a source Internet Protocol (IP) address and a destination IP address of the RSVP-TE message. If a session exists for the RSVP-TE message, RSVP-TE distributor 520 may transmit the RSVP-TE message to a shelf controller 320 associated with (e.g., mapped to) the session.

If a session does not exist for the RSVP-TE message, RSVP-TE distributor 520 may select a particular shelf controller 320 to receive the RSVP-TE message. In one implementation, RSVP-TE distributor 520 may select a particular shelf controller 320 based on a fixed mapping. For example, a fixed mapping may specify that messages that are received by a particular interface (e.g., port 1) are to be distributed to a particular shelf controller 320 (e.g., shelf controller 320-4). In another implementation, RSVP-TE distributor 520 may use a load balancing technique to select a particular shelf controller 320. In one example, RSVP-TE distributor 520 may select the particular shelf controller 320 with the lightest load (e.g., least quantity of sessions associated with the particular shelf controller 320). In another example, RSVP-TE distributor 520 may use hash lookup to select the particular shelf controller 320. For example, RSVP-TE distributor 520 may perform a hash operation based on the source IP address and the destination IP address of the RSVP-TE message. If a result of the hash operation is within a particular range, RSVP-TE distributor 520 may select the particular shelf controller 320 that corresponds to the particular range.

After a shelf controller 320 is selected, RSVP-TE distributor 520 may transmit the RSVP-TE message to the selected shelf controller 320. RSVP-TE distributor 520 may also update a global session lookup table to indicate that the session associated with the RSVP-TE message is mapped to the selected shelf controller 320. The mapping may associate, in the global session lookup table, the identifier(s) of the received RSVP-TE message with an identifier of the selected shelf controller 320, as described below in reference to FIG. 7A. After the mapping, the updated information in the global session lookup table is available to all other interface unit controllers 330 of node 120.

FIG. 6 is a diagram of example functional components of shelf controller 320 of node 120. As shown in FIG. 6, shelf controller 320 may include a slave resource manager 610 and a protocol manager 620. Each of functional components 610 and 620 may be implemented within one or more of the components illustrated in FIG. 4. While FIG. 6 illustrates a particular number and arrangement of functional components, shelf controller 320 may include additional functional components, fewer functional components, or different functional components.

Slave resource manager 610 may allocate resources for connections associated with RSVP-TE messages. Slave resource manager 610 may receive an initial block (e.g., allocation) of resources from a master resource manager of node controller 310. Shelf controller 320 may receive an RSVP-TE message from RSVP-TE distributor 520 (FIG. 5) of interface unit controller 330. Slave resource manager 610 may perform admission control and reserve a portion of resources, from the block of resources, for a connection associated with the RSVP-TE message. The resources may include one or more labels, bandwidth, switch fabric resources, hardware resources, etc.

Slave resource manager 610 may determine, on a periodic basis, whether an amount of unreserved resources that slave resource manager 610 has left to allocate is below a particular threshold. When the amount of unreserved resources is below the particular threshold, slave resource manager 610 may transmit a message to the master resource manager of node controller 310 to request additional resources. In response, slave resource manager 610 may receive an additional block of resources from the master resource manager of node controller 310.

Protocol manager 620 may manage connection states. After slave resource manager 610 performs admission control and reserves resources for a connection associated with a RSVP-TE message, protocol manager 620 may program the hardware of node 120 to set up actual hardware connection states. Protocol manager 620 may manage path and resv states. Protocol manager 620 may store a path state after a path message is sent from a sender node along a data path. The path state may include, for example, an IP address of a previous node 120, from which the path message was received. Protocol manager 620 may transmit a resv message in a reverse direction of the data path. The resv sate may indicate that the resv message was transmitted to node 120.

Example Tables

FIGS. 7A and 7B are diagrams illustrating example tables used by interface unit controller 300. FIG. 7A illustrates an example global session lookup table 700 (herein, table 700).

RSVP-TE distributor 520 (FIG. 5) may populate table 700 with mappings for different RSVP-TE messages. In one implementation, each interface unit controller 330 may store table 700. In another implementation node controller 310 may store table 700. RSVP-TE distributor 520 may refer to table 700 to determine whether a session already exists for an RSVP-TE message received by interface unit controller 330. As shown in FIG. 7A, table 700 may include a session identifier field 710, a source identifier field 720, a destination identifier field 730, and a shelf controller identifier field 740. In practice, table 700 may include additional fields, fewer fields, or different fields than are shown in FIG. 7A.

For example, RSVP-TE distributor 520, of interface unit controller 330, may receive an RSVP-TE message. Assume that table 700 does not include an entry for a session associated with the RSVP-TE message. RSVP-TE distributor 520 may determine a mapping for the session associated with the RSVP-TE message. The mapping may specify a particular shelf controller 320 that is selected to receive the RSVP-TE message. RSVP-TE distributor 520 may add an entry to table 700 for the session based on the mapping. Table 700 is described below in reference to this example.

Session identifier field 710, of table 700, may include an identifier, that is assigned by RSVP-TE distributor 520, that uniquely identifies a new session that is added to table 700. The identifier may include a numerical value, one or more characters, and/or any other information that makes up a unique identifier. For example, RSVP-TE distributor 520 may assign a value that is an increment higher than the highest existing value in session identifier field 710. Source identifier field 720 may include a source address, such as a source IP address, that is included in the RSVP-TE message. Destination identifier field 730 may include a destination address, such as a destination IP address, that is included in the RSVP-TE message. Shelf controller identifier field 740 may include an identifier associated with the particular shelf controller 320 selected by RSVP-TE distributor 520. After table 700 is updated, all interface unit controllers 330 of node 120 may receive the updated table 700. Each one of interface unit controllers 330 may store and further update the updated table 700.

Therefore, for example, when any interface controller 310 receives another RSVP-TE message that includes the source IP address and the destination IP address, RSVP-TE distributor 520 may determine that the session, added to table 700, exists for the message. RSVP-TE distributor 520 may transmit the other RSVP-TE message to the particular shelf controller 320 identified in shelf controller identifier field 740 and that corresponds to the source IP address and the destination IP address.

FIG. 7B illustrates an example table 750 that stores information about loads of different shelf controllers 320 of node 120. In one implementation, each interface unit controller 330 may store table 700. In another implementation node controller 310 may store table 700. Shelf controller 320 and/or interface unit controller 330 may update table 750 after session(s) are added for RSVP-TE messages. RSVP-TE distributor 520 may use table 750 to select a particular shelf controller 320 as a recipient of an RSVP-TE message to balance the loads of shelf controllers 320. As shown in FIG. 7B, table 750 may include shelf controller identifier field 740 and a quantity of sessions field 760. In practice, table 750 may include additional fields, fewer fields, or different fields than are shown in FIG. 7B.

Shelf controller identifier field 740 may include an identifier associated with a particular shelf controller 320, as described above. Quantity of sessions field 760 may include information identifying a quantity of sessions associated with a corresponding shelf controller 320. Each session may correspond, for example, to a unique combination of a source IP address and a destination IP address of an RSVP-TE session, which is forwarded to the corresponding shelf controller 320. Quantity of sessions field 760 may be updated by increasing a current value of quantity of sessions field 760 by a single increment (e.g., 1) when the corresponding shelf controller 320 is selected to receive a new RSVP-TE message with a unique combination of a source IP address and a destination IP address associated with a session. After table 750 is updated, all interface unit controllers 330 of node 120 may receive the updated table 750. Each one of interface unit controllers 330 may store and further update the updated table 750.

Example Processes

Figure 8:
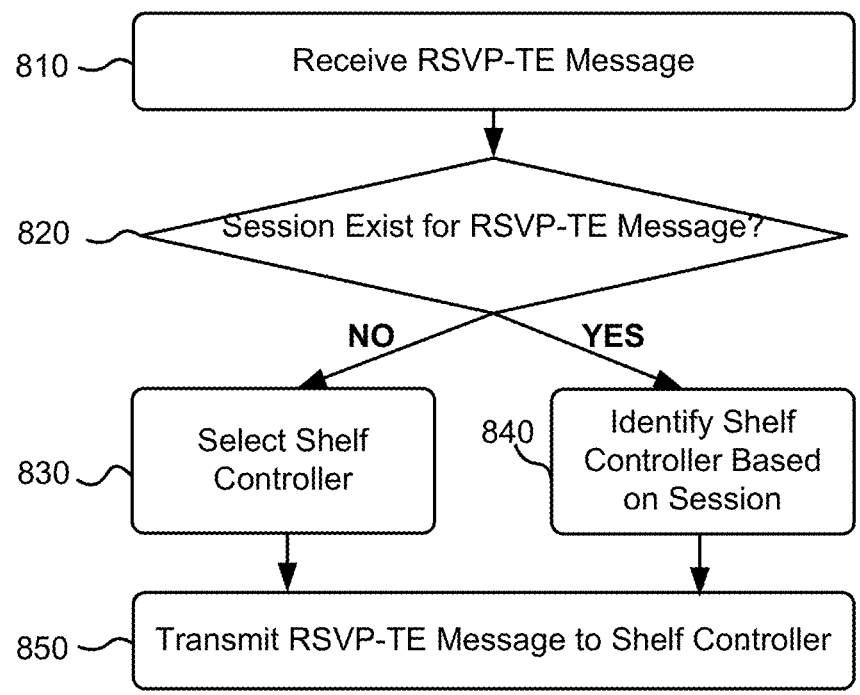
FIG. 8 is a flowchart of an example process for forwarding a Resource Reservation Protocol-Traffic Engineering (RSVP-TE) message to a shelf controller.

FIG. 8 is a flowchart of an example process 800 for forwarding an RSVP-TE message to shelf controller 320 of node 120. In one implementation, interface unit controller 330, of node 120, may perform process 800. In another implementation, a device or collection of devices separate from, or in combination with, interface unit controller 330 may perform some or all of process 800.

As shown in FIG. 8, process 800 may include receiving an RSVP-TE message (block 810) and determining whether a session exists for the RSVP-TE message (block 820). For example, interface unit controller 330 may store or have access to a global lookup table (e.g., table 700 of FIG. 7A), for node 120, that includes information about different existing sessions associated with RSVP-TE messages. Interface unit controller 330 may also store or have access to a load-balancing table (e.g., table 750 of FIG. 7B) that includes information about the loads of (e.g., quantity of sessions associated with) shelf controllers 320 of node 120. Interface unit controller 330 may receive an RSVP-TE message via a particular interface (e.g., port 1) of interface unit controller 330. The RSVP-TE message may include identifiers, including, for example, a source IP address and a destination IP address associated with a session. Interface unit controller 330 may use the global lookup table to determine whether an entry exists corresponding to identifiers associated with the session.

If a session does not exist for the RSVP-TE message (block 820—NO), process 800 may further include selecting a shelf controller 320 (block 830). For example, interface unit controller 330 may determine that a session does not exist for the RSVP-TE message when the global lookup table does not store information for a session associated with the same identifiers as those included in the RSVP-TE message. When interface unit controller 330 determines that a session does not exist for the RSVP-TE message, interface unit controller 330 may select a shelf controller 320.

In one implementation, interface unit controller 330 may select shelf controller 320 based on a mapping between values associated with interfaces (e.g., ports) of interface unit controller 330 and identifiers of shelf controllers 320 of node 120. For example, the mapping may map a value (e.g., 3) of the particular interface (e.g., port 3) to an identifier associated with a particular shelf controller 320 (e.g., shelf controller 320-2). Interface unit controller 330 may select the particular shelf controller 320 based on the mapping. In another implementation, interface unit controller 330 may use a load balancing technique to select a shelf controller 320. For example, interface unit controller 330 may use the load-balancing table (e.g., table 750 of FIG. 7B) to select a particular shelf controller 320 (e.g., shelf controller 320-2) with the lightest load (e.g., shelf controller 320 that has the least number of associated/corresponding sessions). In other implementations, interface unit controller 330 may use one or more other techniques to select a particular shelf controller 320 (e.g., round robin, weighted round robin, etc.).

If a session exists for the RSVP-TE message (block 820—YES), process 800 may further include identifying a shelf controller 320 based on the session (block 840). For example, interface unit controller 330 may determine that a session exist for the RSVP-TE message when the global lookup table includes an entry for a session associated with the same identifiers as those included in the RSVP-TE message. When interface unit controller 330 determines that the session exists for the RSVP-TE message, interface unit controller 330 may identify shelf controller 320 that is specified in the entry (e.g., in shelf controller identifier field 740 of table 700) associated with the session.

Process 800 may also include transmitting the RSVP-TE message to shelf controller 320 (block 850). After selecting (block 830) or identifying (block 840) shelf controller 320, interface unit controller 330 may transmit the RSVP-TE message to that shelf controller 320.

Shelf controllers 320 may receive the RSVP-TE message. Shelf controllers 320 may program, based on the RSVP-TE message, hardware of node 120 to allow forwarding of data packets, associated with the RSVP-TE message, via a data plane of node 120. Programming the hardware may include populating a forwarding table (e.g., an incoming label map (ILM) table), programming another table associated with line cards 210, and/or programming table associated with one or more other portions of the data plane to provide connections via the data plane. Components of the data plane (e.g., line card 210) may use the connections to route the data packets.

Figure 9:
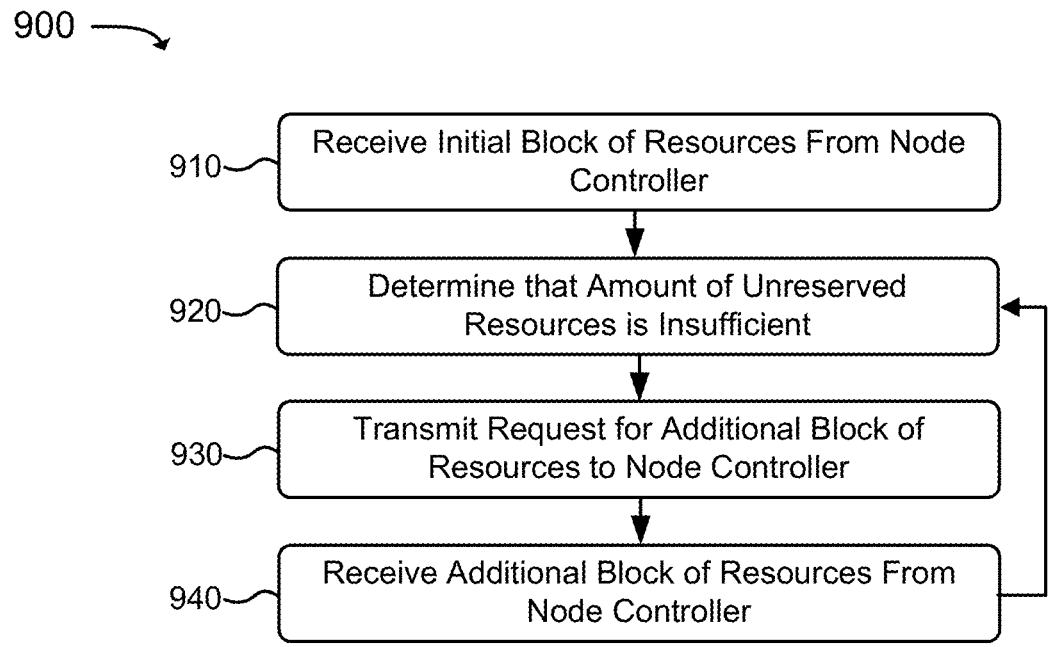
FIG. 9 is a flowchart of an example process for managing resources.

FIG. 9 is a flowchart of an example process for managing resources. In one implementation, shelf controller 320, of node 120, may perform process 900. In another implementation, a device or collection of devices separate from, or in combination with, shelf controller 320 may perform some or all of process 900. Process 900 may occur while shelf controller 320 is receiving RSVP-TE messages, reserving resources for connections associated with the RSVP-TE messages, and/or programming hardware associated with the data plane of node 120 to set up actual hardware connection states for data packets.

As shown in FIG. 9, process 900 may include receiving an initial block of resources from node controller 310 (block 910). For example, node controller 310 may include a master resource manager that manages all resources necessary for node 120 to transmit data packets via a data plane of node 120. After node 120 completes initialization, the master resource manager may allocate an initial block of resources to each shelf controller 320 of node 120. Slave resource manager 610 (FIG. 6) of shelf controller 320 may receive the initial block of resources from the master resource manager.

Process 900 may further include determining that an amount of unreserved resources is insufficient (block 920). For example, during process 900, slave resource manager 610 may reserve/allocate resources for connections associated with received RSVP-TE messages. Meanwhile, slave resource manager 610 may periodically determine whether an amount of resources, that are not yet reserved (i.e., unreserved resources), is insufficient. For example, slave resource manager 610 may determine that the amount of unreserved resources is insufficient when the amount is below a particular threshold.

Process 900 may also include transmitting a request for an additional block of resources to node controller 310 (block 930) and receiving the additional block of resources from node controller 310 (block 940). For example, after determining that the amount of unreserved resources is insufficient, slave resource manager 610, of shelf controller 320, may transmit a request for an additional block of resources to node controller 310. The master resource manager, of node controller 310, may receive the request. In response, the master resource manager may allocate an additional block of resources to shelf controller 320. The master resource manager may transmit the additional block of resources to shelf controller 320. Slave resource manager 610 may receive the additional block of resources. Slave resource manager 610 may continue to reserve resources for connections associated with RSVP-TE messages and to determine whether the amount of unreserved resources, of shelf controller 320, is insufficient (block 920).

CONCLUSION

One or more implementations, described herein, may provide an architecture for distributing, throughout a node, processes for forwarding RSVP-TE messages to shelf controllers and/or processes for managing resources. Interface unit controllers, of the node, may forward the RSVP-TE messages, and shelf controllers may reserve resources for individual connections associated with the RSVP-TE messages. The distributed architecture may reduce the processing burden of a centralized node controller of a node.

Herein, a "table" may refer to any form or arrangement of data in a memory.

The foregoing description provides illustration and description, but is not intended to be exhaustive or to limit the possible implementations to the precise form disclosed. Modifications and variations are possible in light of the above teachings or may be acquired from practice of the implementations. For example, although embodiments described herein refer to the RSVP-TE, other resource reservation-based protocols may be utilized (e.g., RSVP and the like).

Also, while series of blocks have been described with regard to FIGS. 8 and 9, the order of the blocks may be modified in other implementations. Further, non-dependent blocks may be performed in parallel.

Also, certain portions of the implementations have been described as "components" that perform one or more functions. The term "component," may include hardware, such as a processor, an application specific integrated circuit (ASIC), or a field programmable gate array (FPGA), or a combination of hardware and software.

Further, while implementations have been described in the context of an optical network, this need not be the case. These implementations may apply to non-optical networks.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a plurality of shelf controllers to populate a forwarding table used to forward data packets via the device; and
a plurality of interface unit controllers,
where a first interface unit controller, of the plurality of interface unit controllers, is to:
receive a first message from another device, the first message being a Resource Reservation Protocol-Traffic Engineering (RSVP-TE) message,
select a shelf controller, of the plurality of shelf controllers, to receive the first message, and
transmit the first message to the selected shelf controller, where the shelf controller programs a connection, such that packets are forwarded via a data plane of the device based on the message,
where the first message includes one or more identifiers, and
where a second interface unit controller, of the plurality of interface unit controllers, is to:
receive a second message, where the second message is received, by the second interface unit controller, after the first interface unit controller message is received, by the first interface unit controller,
select the shelf controller to receive the second message when one or more identifiers included in the second message match the one or more identifiers included in the first message, and
transmit the second message to the shelf controller based on the selection of the shelf controller to receive the second message,
receive a third message via a port of the third interface unit controller,
determine whether a session already exists for the third message, the session being a label-switched path in a Multiprotocol Label Switching (MPLS) network.

2. The device of claim 1, further comprising:
a node controller to:
transmit a respective block of resources to each one of the plurality of shelf controllers.

3. The device of claim 2, where the shelf controller is further to:
receive a block of resources from the node controller, and
reserve the portion of the block of resources for the connection associated with the first message.

4. The device of claim 2,
where the node controller is further to:
receive a request for an additional block of resources from the shelf controller,
allocate the additional block of resources to the shelf controller, and
transmit the additional block of resources to the shelf controller.

5. The device of claim 1,
where the first interface unit controller receives the first message via a port of the first interface unit controller, and
where the first interface unit controller selects the shelf controller based on a mapping between the port and the shelf controller.

6. The device of claim 1,
where the shelf controller is a first shelf controller,
where a third interface unit controller, of the plurality of interface unit controllers, is to:
select a second shelf controller, of the plurality of shelf controllers, to receive the third message based on a load of the second shelf controller, where the load of the second shelf controller is less than other loads of the plurality of shelf controllers, and
transmit the third message to the second shelf controller based on the selection of the second shelf controller.

7. The device of claim 1, where the first interface unit controller is further to:
where, before the first interface unit controller selects the shelf controller, a third interface unit controller, of the plurality of interface unit controllers, is to:
receive a third message, where the third message is received by the third interface unit controller before the first message is received by the first interface unit controller,
select the shelf controller to receive the third message, and
add an entry, for a session associated with the third message, to a memory that stores information for a plurality of sessions,
where, after adding the entry, the session is one of the plurality of sessions, and
where the entry, comprises:
a source address included in the first message and the third message,
a destination address included in the first message and the third message, and
an identifier of the shelf controller.

* * * * *